(12) United States Patent  
Langley et al.

(10) Patent No.: US 12,170,012 B2  
(45) Date of Patent: Dec. 17, 2024

(54) CONTAINER CONTENT MONITORING DEVICE AND SYSTEM

(71) Applicant: DeTech, LLC, Hebron, CT (US)

(72) Inventors: Mark Langley, Hebron, CT (US); Richard Langley, Hebron, CT (US)

(73) Assignee: DETECH, LLC, Hebron, CT (US)

( * ) Notice: Subject to any disclaimer, the term of this patent is extended or adjusted under 35 U.S.C. 154(b) by 0 days.

(21) Appl. No.: 17/737,291

(22) Filed: May 5, 2022

(65) Prior Publication Data

US 2024/0096192 A1   Mar. 21, 2024

Related U.S. Application Data

(63) Continuation-in-part of application No. 17/351,349, filed on Jun. 18, 2021, which is a continuation-in-part of application No. 16/598,609, filed on Oct. 10, 2019, now Pat. No. 11,092,509.

(60) Provisional application No. 62/888,766, filed on Aug. 19, 2019.

(51) Int. Cl.  
   *G08B 21/18*   (2006.01)

(52) U.S. Cl.  
   CPC ................... *G08B 21/182* (2013.01)

(58) Field of Classification Search  
   CPC .................................................. G08B 21/182  
   See application file for complete search history.

(56) References Cited

U.S. PATENT DOCUMENTS

| | | | |
|---|---|---|---|
| 6,418,981 B1* | 7/2002 | Nitecki | B67D 7/0486 141/94 |
| D703,557 S | 4/2014 | Wurts et al. | |
| 11,092,509 B1 | 8/2021 | Langley et al. | |
| 2007/0024465 A1 | 2/2007 | Howell et al. | |
| 2013/0245991 A1 | 9/2013 | Kriss | |
| 2014/0013824 A1 | 1/2014 | Welt | |
| 2015/0256545 A1 | 9/2015 | Dotterer, III et al. | |
| 2016/0131533 A1 | 5/2016 | Parker et al. | |
| 2016/0284153 A1 | 9/2016 | Tansley, Jr. et al. | |
| 2016/0368629 A1 | 12/2016 | Storey | |
| 2017/0316673 A1* | 11/2017 | Gorr | G01N 27/4167 |

(Continued)

OTHER PUBLICATIONS

PCT International Search Report, International App. No. PCT/US23/21117, dated Sep. 14, 2023.

(Continued)

*Primary Examiner* — James J Yang  
(74) *Attorney, Agent, or Firm* — McCormick, Paulding & Huber, PLLC

(57) ABSTRACT

A container content monitoring system includes at least one container content monitoring device including a housing, a weight sensor configured to detect a weight of an object, a temperature sensor configured to detect a temperature of the object, a transmitter, and a controller operatively connected to the temperature sensor, the weight sensor, and the transceiver. The transmitter may be configured to communicate with a cloud server remote from the container content monitoring device. The container content monitoring system further includes a router device configured to communicate with the at least one container content monitoring device, a cloud server remote from the at least one container content monitoring device, and a first user device configured to communicate with the cloud server.

9 Claims, 7 Drawing Sheets

(56) References Cited

U.S. PATENT DOCUMENTS

| | | | |
|---|---|---|---|
| 2019/0264872 A1* | 8/2019 | Kermaidic | F17C 13/023 |
| 2020/0072698 A1* | 3/2020 | Baird, IV | G01K 13/00 |
| 2020/0339324 A1* | 10/2020 | Pietryga | F17C 13/021 |
| 2020/0386649 A1 | 12/2020 | Baird, IV et al. | |
| 2021/0239275 A1 | 8/2021 | Williams | |
| 2022/0084266 A1 | 3/2022 | Renz | |

OTHER PUBLICATIONS

Group Four Transducers Inc. "Tank Hopper and Vessel Weighing." Website. Accessed Apr. 25, 2024. https://www.groupfourtransducers.com/load-cells-for/tank-hopper-and-vessel-weighing/.

PrimeUSAScales. "Wireless Scales." Website. Accessed Apr. 25, 2024. https://primeusascales.com/product-category/wireless-scales/.

5bestcomparison. "Top 5 Best Smart Body Scales." Website. Updated Aug. 28, 2023. Accessed Apr. 25, 2024. https://5bestcomparison.com/best-smart-scale/.

UEI Test Instruments. "Charging Scales." Website. Accessed Apr. 25, 2024. https://www.ueitest.com/ECommerce/category/products/refrigeration/charging-scales#p-1.

\* cited by examiner

| 702 | 704 | 706 | 708 | 710 | 712 | 714 | 716 | 718 | 720 | 722 | 724 |
|---|---|---|---|---|---|---|---|---|---|---|---|
| Name | Identifier 116 | Model # | Serial # | Manufacture (Or Put Into Service) Date | Repair Date | Certification Date | Calibrate Date | Tank Type | Tank Size | Alert Distribution Scheme | CCM System |
| 1004 | [barcode] | MLDT04 | ABC123 | XX/YY/ZZZZ | XX/YY/ZZZZ | XX/YY/ZZZZ | XX/YY/ZZZZ | Dewar — (of material type) | 25L | ·Alert 1- to user device 400A ·Alert 2- to all user devices = 400A | 10 |

FIG. 7

CONTAINER CONTENT MONITORING DEVICE AND SYSTEM

CROSS-REFERENCE TO RELATED APPLICATION

This application is a continuation-in-part of U.S. patent application Ser. No. 17/351,349, filed Jun. 18, 2021, which is a continuation-in-part of U.S. patent application Ser. No. 16/598,609, filed Oct. 10, 2019, which claims the benefit of U.S. Provisional Patent Application No. 62/888,766, filed Aug. 19, 2019, each of which is hereby incorporated by reference in its entirety.

BACKGROUND

Conventional container content monitoring devices and systems are used to monitor one or more parameters of contents contained within a container. Some conventional devices and systems use a temperature sensor arranged in the lid of the container to monitor a temperature of the contents.

There are drawbacks associated with conventional monitoring devices and systems. For example, devices and systems that use a temperature sensor to monitor the temperature of contents contained within the container may be subject to harsh conditions depending on the state of the contents. If the contents have a significantly high or low temperature, then the temperature sensor may be required to have a robust design to withstand repeated temperature changes and thermal stresses and flexing of connections to sensor due to frequent access to the container. Even with a robust design, the harsh temperature of the contents may lead to early failure of the temperature sensor, which may be unacceptable for the monitoring protocol of the container.

SUMMARY

A container content monitoring device in accordance with embodiments of the present disclosure includes a top plate connected to a housing, a weight sensor configured to detect a weight of an object arranged on the top plate, a temperature sensor configured to detect a temperature of the object where the object contacts the top plate, a transmitter, and a controller operatively connected to the temperature sensor, the weight sensor, and the transceiver. The transmitter may be configured to communicate with a cloud server remote from the container content monitoring device.

A container content monitoring system in accordance with embodiments of the present disclosure includes at least one container content monitoring device, each container content monitoring device of the at least one container content monitoring device including a top plate connected to a housing, a weight sensor configured to detect a weight of an object arranged on the top plate, a temperature sensor configured to detect a temperature of the object where the object contacts the top plate, a transmitter, and a controller operatively connected to the temperature sensor, the weight sensor, and the transceiver. The container content monitoring system in accordance with embodiments of the present disclosure further includes a router device configured to communicate with the at least one container content monitoring device, a cloud server remote from the at least one container content monitoring device, and a first user device configured to communicate with the cloud server. The transmitter may be configured to communicate with the cloud server.

BRIEF DESCRIPTION OF THE DRAWINGS

FIG. 7 is an inventory matrix in accordance with embodiments of the present disclosure;

DETAILED DESCRIPTION

Figure 1:
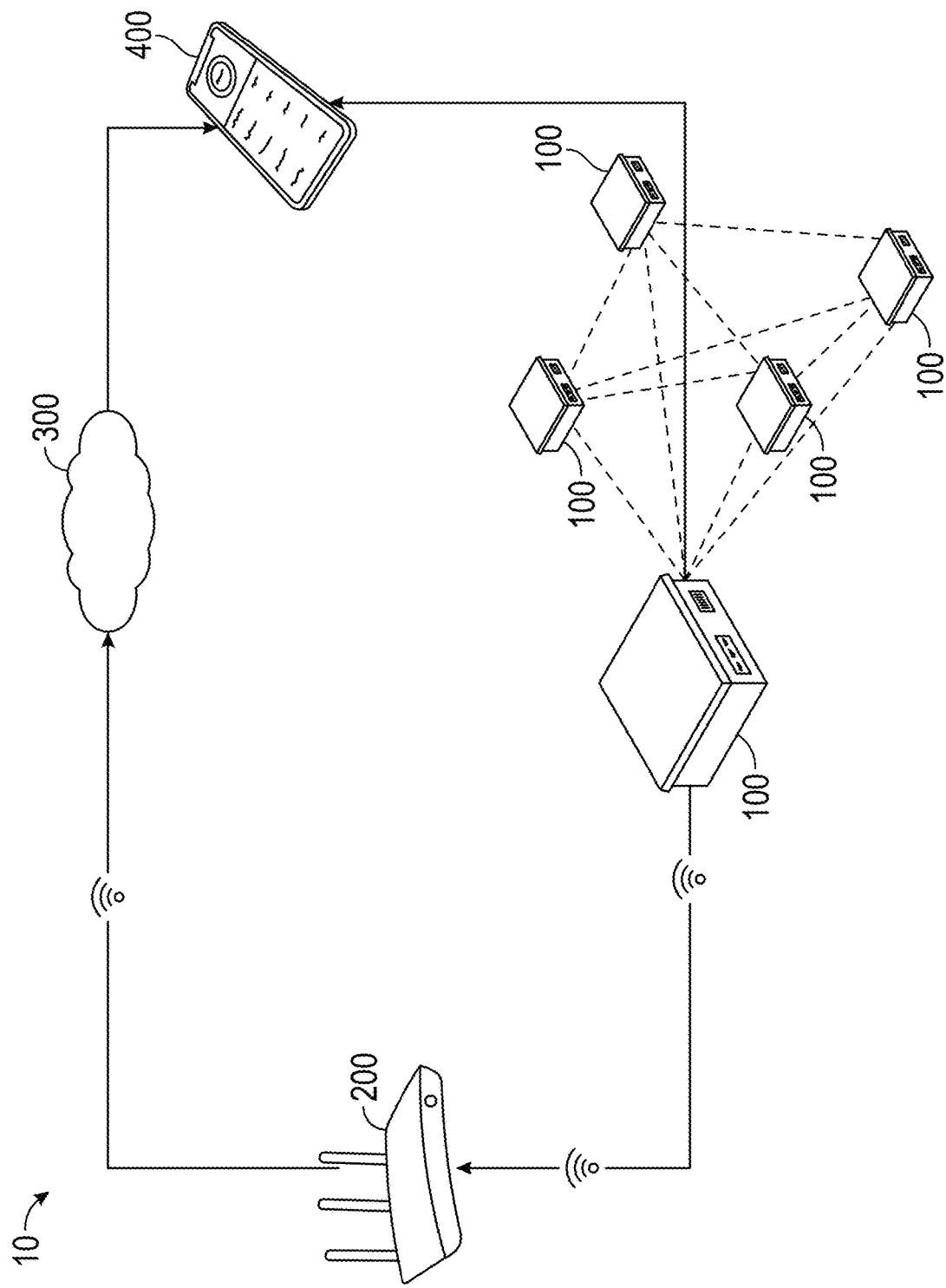
FIG. 1 is a diagram of a container content monitoring system in accordance with embodiments of the present disclosure.

Referring to FIG. 1, an exemplary container content monitoring ("CCM") system 10 includes a plurality of CCM devices 100, a gateway (or router device) 200, a cloud server 300 and a user device 400. The CCM devices 100 are configured to wirelessly communicate with the gateway 200. The gateway 200 is configured to wirelessly communicate with the cloud server wired or wirelessly 300. The cloud server 300 is configured to wirelessly communicate with the user device 400. The plurality of CCM devices 100 are optionally configured to communicate directly with the user device 400. The CCM devices 100, gateway 200, cloud server 300 and user device 400 are all remote from each other.

Figure 8:
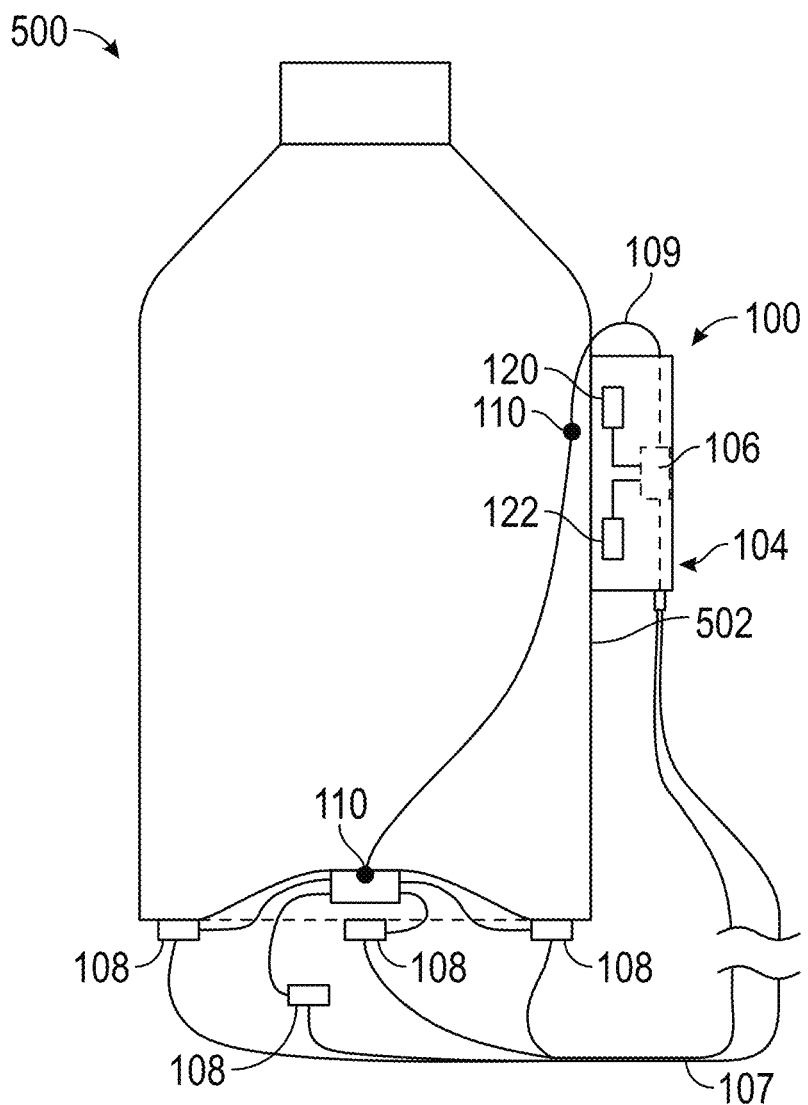
FIG. 8 is a side view of a container content monitoring device in accordance with embodiments of the present disclosure.

Referring to FIGS. 2A-2D, an exemplary CCM device 100 is shown in accordance with embodiments of the present disclosure. The CCM device 100 includes a top plate 102 connected to a top of a housing 104. A controller 106 is arranged within the top plate 102 and/or housing 104 and is operatively connected to a weight sensor 108, a temperature sensor 110 and a transceiver 112. A display screen 114 is optionally included as a part of the housing 104 and is operatively connected to the controller 106. The weight sensor 108 is arranged within or on the top plate 102 and/or housing 104 and is configured to measure (or detect) the weight of a container (or other object) placed on top of the top plate 102. The temperature sensor 110 is arranged within, on and/or under the top plate 102, housing 104 and/or an external surface mount of the container 500 and is configured to measure (or detect) a temperature of a container (or other object) placed on top of the top plate 102 where the container (or object) contacts the top plate 102. In some embodiments, the temperature sensor 110 is arranged to measure (or detect) a temperature of the container 500 or surface mount of the container 500 at a portion that does not contact the top plate 102 (e.g. as shown in FIG. 8, which is discussed in greater detail later herein). The transceiver 112 is configured to send and/or receive signals to and/or from the cloud server 300, which is discussed in greater detail below herein.

The CCM device 100 further includes an identifier 116. In one embodiment, the identifier 116 is a bar code and has a paired identifier bar code provided to the end user to be attached to the container 500 to assure the CCM device 100 and container 500 are matched during the life cycle of the CCM device 100 and container 500.

The weight sensor 108 is centrally located with respect to the top plate 102 and may be composed of a singular load cell or a group of load cells that come into direct or indirect contact with the underside of top plate 102 and housing 104, the load cell(s) being configured in such a way as to singularly and/or collectively calculate the weight of the container 500 with respect to the top plate 102. The temperature sensor(s) 110 is located at a distance from the center of the top plate 102. The temperature sensor(s) is integrated in such a way as to provide temperature monitoring of the top plate 102 and/or is in direct contact with target container 500. In some embodiments, it may be preferable to switch the positions of the weight sensor 108 and the temperature sensor 110, or to have both sensors 108, 110 centrally located with respect to the top plate 102, or to have both sensors arranged away from the center of the top plate 102 depending on the desired configuration. The desired configuration may be based on the size and shape of the container (or other object) to be placed on the CCM device 100.

Based on signals from the controller 106, the display screen 114 is configured to display a weight value (or weight data) as measured by the weight sensor 108. The weight value may be displayed in one or more units, such as kilograms and/or pounds. The controller 106 is configured to optionally perform a tare function to set the recognized weight value at the weight sensor 108 to zero when the tare function is performed. Based on signals from the controller 106, the display screen 114 is configured to display a temperature value (or temperature data) as measured by the temperature sensor 110. The temperature value may be displayed in one or more units, such as Fahrenheit, Celsius, and/or Kelvin. The controller 106 is configured to monitor and record the weight data and temperature data continuously, intermittently or periodically.

Figure 2A:
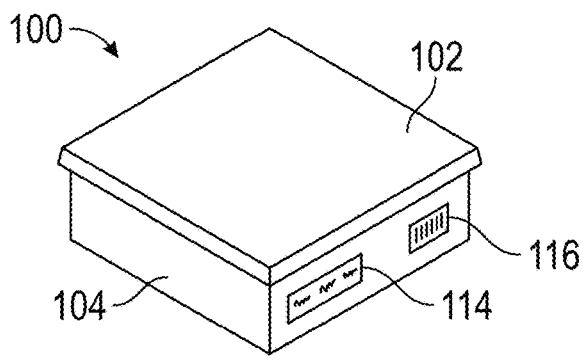
FIG. 2A is a top, front and left perspective view of a container content monitoring device in accordance with embodiments of the present disclosure.
Figure 2B:
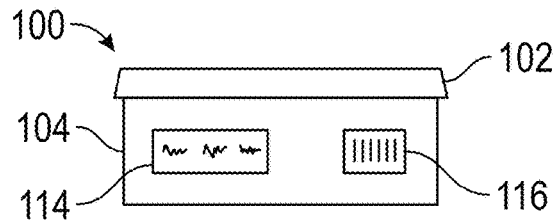
FIG. 2B is a front view of the container content monitoring device of FIG. 2A in accordance with embodiments of the present disclosure.
Figure 2C:
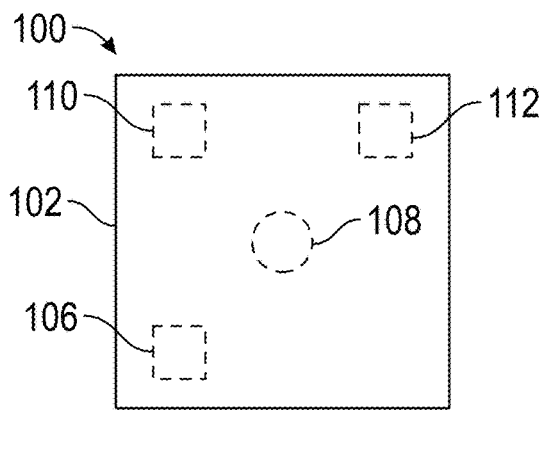
FIG. 2C is a top view of the container content monitoring device of FIG. 2A in accordance with embodiments of the present disclosure.
Figure 2D:
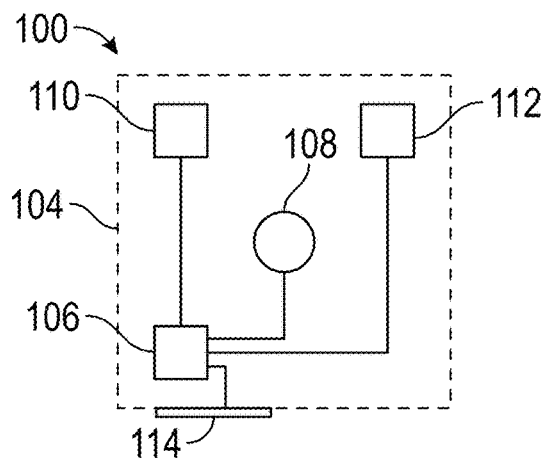
FIG. 2D is a schematic view of components of the container content monitoring device of FIG. 2A in accordance with embodiments of the present disclosure.
Figure 3A:
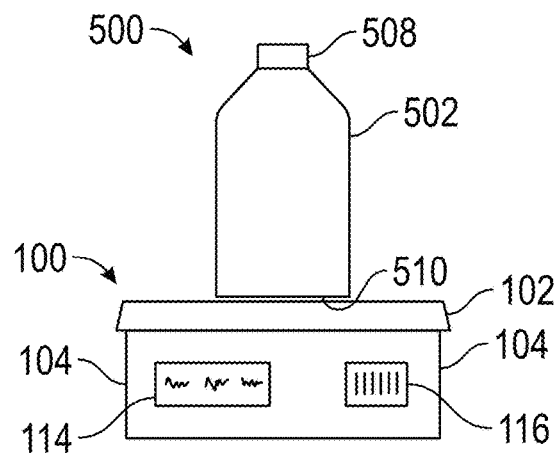
FIG. 3A is a front view of the container content monitoring device of FIG. 2A with a container arranged thereon in accordance with embodiments of the present disclosure.
Figure 3B:
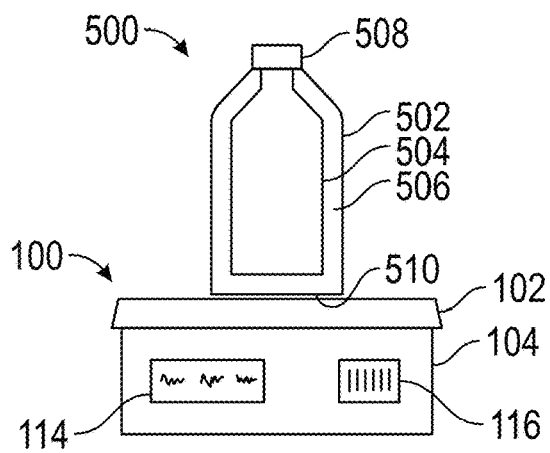
FIG. 3B is a front view of the container content monitoring device with the container arranged thereon of FIG. 3A, the container being transparently illustrated, in accordance with the embodiments of the present disclosure.
Figure 3C:
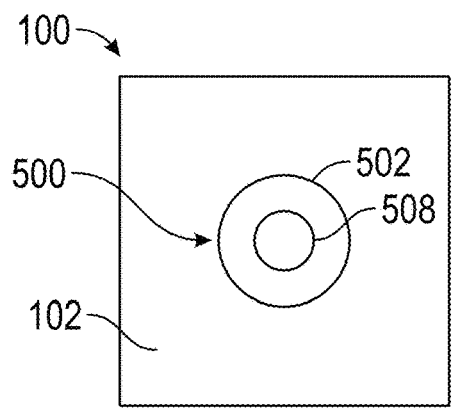
FIG. 3C is a top view of the container content monitoring device with the container arranged thereon of FIG. 3A in accordance with embodiments of the present disclosure.

Referring to FIGS. 3A-3C, the CCM device 100 of FIG. 2A is shown with a Dewar type container 500 arranged thereon. The Dewar container 500 includes an outer body 502, an inner body 504, and a space 506 between the outer body 502 and the inner body 504 that is vacuum sealed. The inner body 504 is configured to store contents therein. A lid 508 is provided at the top of the container 500 to seal the inner body 504, and any contents stored therein. A bottom 510 of the container 500 is in contact with the top of the top plate 102 of the CCM device 100.

The CCM device 100 is configured to continuously, intermittently or periodically monitor the temperature of the bottom 510 of the container 500 through measurement (or detection) with the temperature sensor 110. Similarly, the CCM device 100 is configured to continuously, intermittently or periodically monitor the weight of the container 500 and its contents through measurement (or detection) with the weight sensor 108. The controller 106 is configured to compare the obtained weight data with a predefined threshold, such as a low threshold, high threshold, and/or rate of change threshold. Similarly, the controller 106 is configured to compare the obtained temperature data with a low threshold, a high threshold, and/or a rate of change threshold. The CCM device 100 is also configured to generate and distribute alerts after a comparison of the weight data and/or temperature data being determined as exceeding a threshold. For example, an alert may be generated if the temperature data decreases below or increases above (or outside) a low temperature threshold or the weight data decreases below or above (or outside) a low weight threshold. As an alternative to the predefined threshold, or in addition thereto, the CCM device 100 can be configured to compare the weight data and/or temperature data with one or more dynamic thresholds that are set based on certain current conditions (or measured parameters), such as the weight of the contents/container, the room temperature, time of day, and the like. The thresholds can also be configured to the size container 500 and/or the quantity, mass, or volume of contents to be stored therein.

In some embodiments, a decreased temperature reading at the bottom 510 and/or outer body 502 of the container 500 may indicate that the vacuum seal of the space 506 has been broken. Since the laws of thermodynamics do not provide for the thermal transfer of heat energy between two objects separated by a vacuum via conduction or convection, the thermal integrity of container 500 is substantially maintained if a hermetically sealed vacuum is maintained between the outer wall 502 and the inner wall 504. As soon as the vacuum in the space 506 is compromised, either gradually or in a single instant the thermodynamic properties between surfaces 502 and 504 will allow thermal transfer thus resulting in gradual or dramatic loss of contents, which may result in a change in temperature of surface 502. In the event a vacuum in the space 506 is compromised due to failure of outer wall surface 502, no contents will enter the space 506 and the drop in temperature of surface 502 will be gradual or rapid depending upon the vacuum remaining in space 506. In the event a vacuum in the space 506 is compromised due to failure of inner wall surface 504, then contents may enter the space 506 depending upon the liquid level within the container 500 and the levels of contents in the container 500 respectively. Should contents enter the space 506 resulting in a rapid temperature change of the temperature of the bottom 510 and/or outer body 502 of the container 500 and/or a rapid weight loss, one or both may be recorded by the CCM device 100 in real time.

For example, the vacuum seal of the space 506 may be broken when the inner body 504 of the container 500 has been breached or damaged and the contents of the container 500 may enter the space 506 and come into contact with the bottom 510 and/or outer body 502 of the container 500. If the contents were, e.g., a cryogenic substance such as liquid nitrogen, the breach and resulting flow of liquid nitrogen into the space 506 could cause the obtained temperature data to decrease below or above (or outside) a predefined low temperature threshold. In some embodiments, the lid 508 may not be properly engaged with the body 502, which could lead to escape of the contents stored in the inner body 504 through the unsealed lid 508 by known processes, such as evaporation, sublimation, and the like, which could eventually cause the obtained weight data to decrease below or above (or outside) a predefined low weight threshold.

Figure 4A:
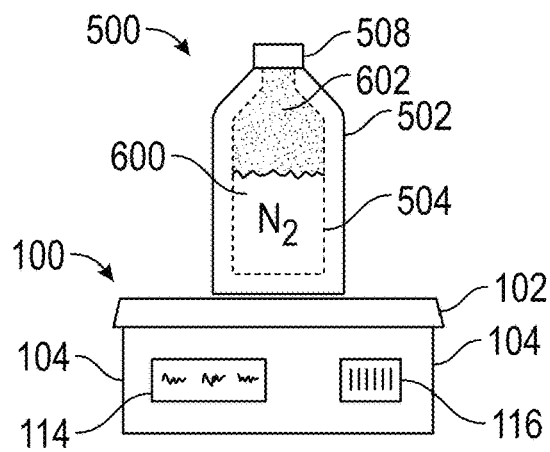
FIG. 4A is a front view of the container content monitoring device of FIG. 2A with a container arranged thereon containing liquid nitrogen in accordance with embodiments of the present disclosure.
Figure 4B:
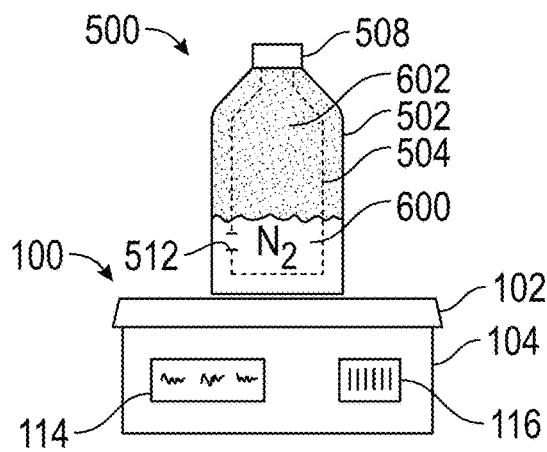
FIG. 4B is a front view of the container content monitoring device with the container arranged thereon of FIG. 4A with a breach in the container in accordance with embodiments of the present disclosure.

In the embodiment shown in FIGS. 4A and 4B, the Dewar flask 500 contains liquid nitrogen 600 as well as gaseous nitrogen 602. FIG. 4B shows one type of breach 512 possible in the inner body 504, which results in the liquid nitrogen 600 and/or gaseous nitrogen 602 entering the space 506. In some embodiments, a decreased weight reading detected by the weight sensor 108 indicates that too much nitrogen has evaporated or escaped from the container 500 and the liquid nitrogen must be replaced or the Dewar flask 500 be repaired or replaced. While the breach 512 is shown as being located where the liquid nitrogen 600 is arranged, a breach could also occur above the level of the liquid nitrogen 600, i.e. where the gaseous nitrogen 602 is arranged. The CCM device 100 is configured to detect a breach no matter where the breach is located.

The CCM device 100 may be configured to generate and distribute alerts having different levels of importance or urgency. In some embodiments, the obtained weight or temperature data being beyond a first threshold may correspond to a first warning alert, and obtained weight or temperature data being beyond a second threshold may correspond to a second warning alert, the second warning alert being more important or urgent than the first warning alert. In some embodiments, the type of alert could also be based on two parameters being beyond a threshold, such as the weight and temperature being beyond a first and/or second threshold (or a "multi-parameter alert").

Figure 5:
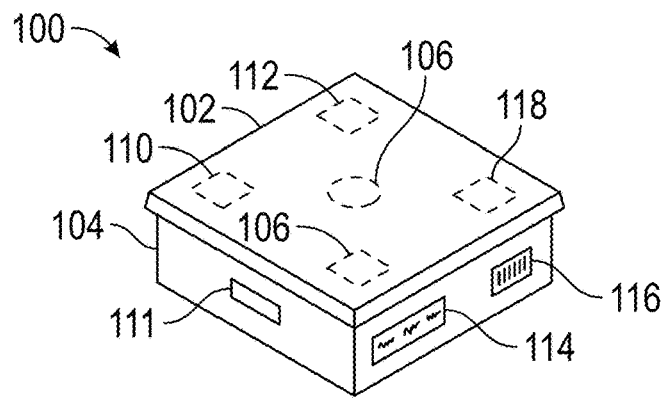
FIG. 5 is a top, front and left perspective view of a container content monitoring device in accordance with embodiments of the present disclosure.

Referring to FIG. 5, the CCM device 100 is equipped with an optional room temperature sensor (or second temperature sensor) 111. The room temperature sensor 111 is configured to measure (or detect) the ambient temperature of the environment of the CCM device 100. The room temperature sensor 111 may be arranged on a different side of the CCM device 100 than the temperature sensor 110 configured to measure the temperature of the bottom of the container 510 and/or outer body 502, e.g. the room temperature sensor 111 may be arranged on the side or bottom of the CCM device 100. The room temperature data allows the controller 106 to compare obtained room temperature data from the room temperature sensor 111 with obtained temperature data of the bottom 510 and/or outer body 502 of the container 500 obtained from the temperature sensor 110 without being influenced by temperature changes associated with the bottom of the container 510 and/or outer body 502 (or at least not as influenced as the temperature sensor 110), as discussed above.

The CCM device 100 includes an optional volatile organic compound ("VOC") detector 118 operatively connected to the controller 106. The VOC detector 118 allows remote and/or local monitoring of ambient VOCs. In embodiments where the container 500 contains VOCs and/or ambient air contains VOCs from other sources, the VOC detector 118 can detect leaks from the container 500 or other sources. This advantageously provides an additional monitoring parameter to the weight and temperature parameters.

Figure 6:
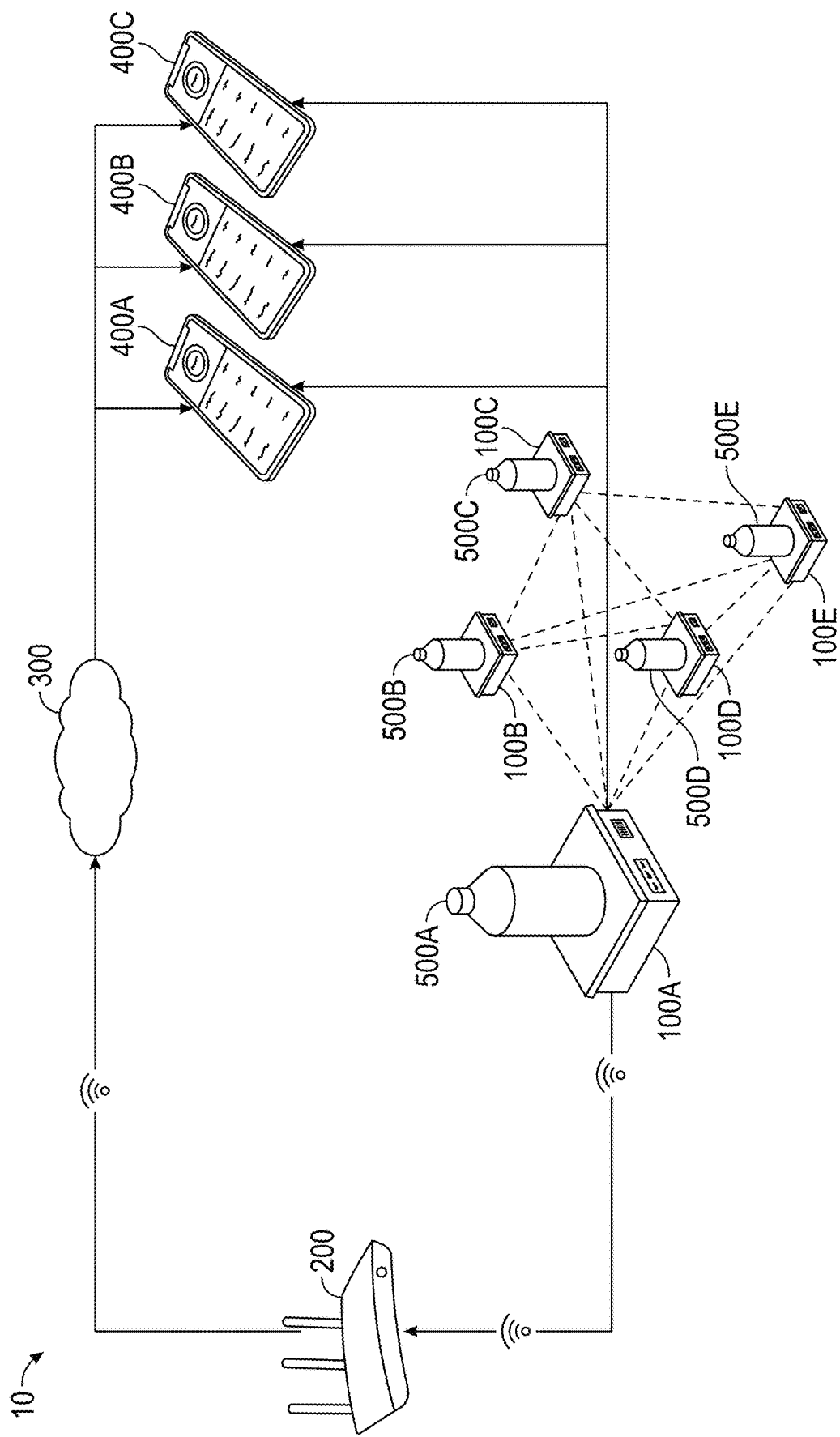
FIG. 6 is a diagram of a container content monitoring system in operation in accordance with embodiments of the present disclosure.

Referring to FIG. 6, a CCM system 10 is shown in operation in accordance with embodiments of the present disclosure. The CCM system 10 is substantially similar as the CCM system of FIG. 1, except that this system 10 comprises a plurality of user devices 400A, 400B, 400C (collectively 400). Otherwise, the system 10 contains similar elements and features as discussed above.

Each CCM device 100A, 100B, 100C, 100D, 100E (collectively 100) has a Dewar flask type container 500A, 500B, 500C, 500D, 500E (collectively 500) arranged thereon. Several of the containers 500A, 500B, 500C may be 25 liter (L) size containers and several of the containers 500D, 500E may be 75 liter (L) size containers. Each container 500 contains liquid nitrogen and gaseous nitrogen. The CCM devices 100 monitor the weight of the containers 500 using respective weight sensors and the temperature of the bottom of the containers using respective temperature sensors as discussed above. The data collected is sent to a router device 200, which delivers the data to the cloud server 300. When desired, a user could operate one of the user devices 400 to access the cloud server 300 in order to obtain a status report of the monitored containers 500.

Even when a user is not accessing the cloud server 300, the CCM devices 100 are monitoring the containers 500. In one scenario, once the weight data in the container 500A is determined to exceed a first low weight threshold (refill limit), the CCM device 100A delivers an alert to the cloud server 300. The cloud server 300 distributes the alert to the plurality of user devices 400 that the container 500A is malfunctioning. In another scenario, the weight data in the container 500B may be determined to not exceed a first low weight threshold, but the rate of change of the weight data is determined to exceed a first rate of change threshold. The cloud server 300 distributes the alert to the plurality of user devices 400 that the container 500B is malfunctioning. Users of the user devices can take appropriate action following receipt of the alert(s).

In some embodiments, the alert may be delivered to a subset of the user devices 400 depending on the type of alert. For example, if a first low weight or temperature threshold is exceeded, the alert may be distributed to a single user device 400A. The single user device 400A may be a predetermined user device 400 or the user device(s) 400 that corresponds to a predetermined schedule depending on the time and/or date or day of the week, e.g. an "on-call schedule." The system 10 may also be configured to distribute the alert to all of the user devices 400 regardless of the predetermined schedule if the user of the predetermined user device 400A does not confirm receipt of the alert or if the weight or temperature data exceeds a second low weight or temperature threshold, indicating a more severe malfunction.

Referring to FIG. 7, an exemplary inventory matrix 700 for storage on a cloud server 300 (or other device) is shown in accordance with embodiments of the present disclosure. The inventory matrix 700 is configured to store inventory information associated with one or more CCM systems 10 and/or CCM devices 100. The inventory information may comprise one or more of the following: custom names 702 of each of CCM device 100, the identifier 704 for each CCM device 100, the model number 706 of each CCM device 100, the serial number 708 of each CCM device 100, the date(s) each CCM device 100 was manufactured (or put into service) 710, repaired 712, certified 714, calibrated 716, and the like. The inventory matrix 700 may also include what tank type 718 and what tank size 720 each CCM device 100 is configured to monitor, which may indicate what type of thresholds the CCM device 100 is configured with. The inventory information may also include the alert distribution scheme 722 for each CCM device 100 depending on the alert, i.e. which user devices 400 are predetermined for receiving alerts for the CCM device 100. Instead of being associated with inventory information, the alert distribution scheme can be stored and utilized separately from the inventory information. Each CCM device 100 can be associated with a particular CCM system 10 in the CCM system column 724.

Referring to FIG. 8, the CCM device 100 has a housing 104 arranged at a side surface of the outer body 502 of the container 500 via a surface mount. The surface mount connects the housing 104 to the container 500 through any known connection mechanisms or devices such as, for example and without limitation, magnets, adhesives, suction cups, fasteners, etc. In this embodiment, no top plate (e.g. 102 of FIG. 2A) is required.

The CCM device 100 includes a plurality of weight sensors 108 arranged underneath the container 500. The weight sensors 108 are external to the housing 104 and are connected to the housing 104 and/or the controller through a weight sensor cable assembly 107. The weight sensor cable assembly 107 is flexible and allows each weight sensor 108 to be arranged individually through dedicated weight sensor ends, which advantageously allows a user to arrange each weight sensor 108 as needed or desired to effectively obtain weight measurements of the container 500 depending on its size and/or shape.

The CCM device 100 includes two temperature sensors 110 external of the housing 104 connected to the housing 104 and/or the controller 106 through a temperature sensor cable 109. One temperature sensor 110 is arranged at any side surface of the outer body 502 of the container 500, and one temperature sensor 110 is arranged underneath the container 500. The temperature sensor cable 109 is flexible and allows for placement of the temperature sensor(s) 110 as desired or needed. In some embodiments, there is only one temperature sensor for placement at the bottom or side of the container 500 as discussed above in connection with earlier embodiments. In some embodiments, there are more than two temperature sensors 110 for a greater number of temperature collection data points. The temperature sensors 110 may connect to, or adhere to, the container 500 through known connection mechanisms and devices, for example and without limitation, through magnets, adhesives, suction cups, fasteners, etc.

The CCM device 100 further includes a relative humidity sensor 120 and an oxygen sensor 122, each configured to transmit measurement data (relative humidity data and/or amount of oxygen data) to the controller 106. The relative humidity sensor 120 is configured to measure the relative humidity (within the immediate surface area of container 500) of the room (or environment) that the CCM device 100 and container 500 are arranged in. The oxygen sensor 122 is configured to measure the amount of oxygen (within the immediate surface area of container 500) in the room (or environment). The controller 106 is configured to make a determination about the status of the container 500 (or object) has failed, been breached, or has improper lid securement based, at least in part, on the measured (or determined) relative humidity of the room (or environment) and/or the oxygen content of the room (or environment within the immediate surface are of container 500). If there is a leak from the container 500, e.g. a liquid nitrogen leak, the oxygen and relative humidity levels in the immediate environment area will decrease based on an amount of leaked material/vapor (e.g. vapor of evaporation of liquid nitrogen leaked). Similar to as discussed above in connection with the weight and temperature data, the controller 106 may be configured to compare the obtained amount of oxygen data with a predefined threshold, such as a low threshold, high threshold, and/or rate of change threshold. Similarly, the controller 106 is configured to compare the obtained relative humidity data with a low threshold, a high threshold, and/or a rate of change threshold. The CCM device 100 is also configured to generate and distribute alerts after a comparison of the amount of oxygen data and/or relative humidity data being determined as exceeding a threshold in addition to or alternatively to the weight and temperature data. For example, an alert may be generated if the amount of oxygen data decreases below or increases above (or outside) a low oxygen threshold or the relative humidity data decreases below or above (or outside) a low relative humidity threshold. As an alternative to the predefined threshold(s), or in addition thereto, the CCM device 100 can be configured to compare the amount of oxygen data and/or relative humidity data with one or more dynamic thresholds that are set based on certain current conditions (or measured parameters), such as the weight of the contents/container, the room temperature, time of day, and the like. The thresholds can also be configured to the size container 500 and/or the quantity, mass, or volume of contents to be stored therein.

Weight measurement data is transmitted to the controller 106 through the weight sensor cable assembly 107 and temperature measurement data is transmitted to the controller 106 through the temperature sensor cable 109. In some embodiments, the weight sensor cable assembly 107 and temperature sensor cable 109 may be omitted and the respective measurement data is transmitted to the controller 106 wirelessly through known wireless communication devices and methods. The controller 106 operates based on the weight measurement data and temperature measurement data as discussed above in connection with other embodiments.

Figure 9A:
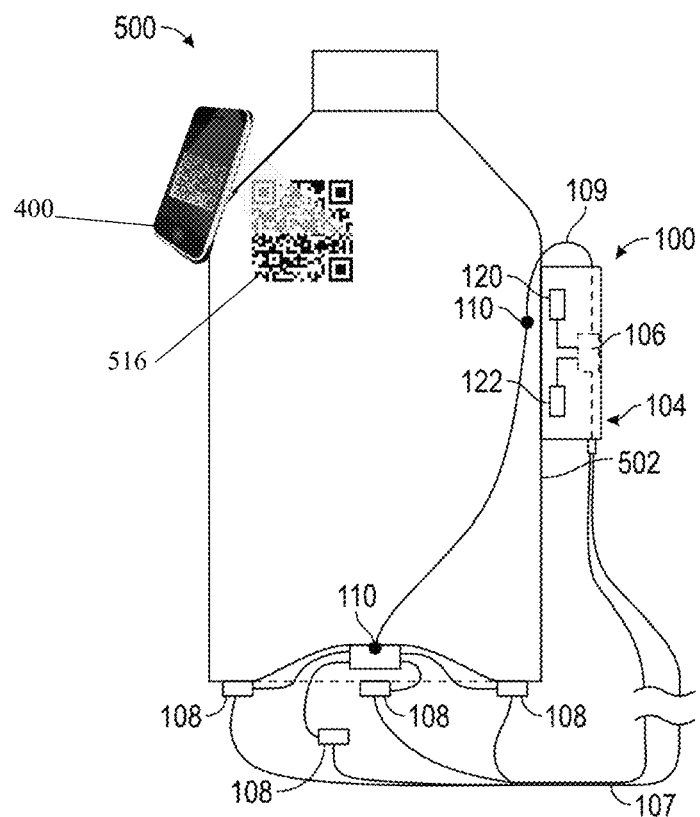
FIG. 9A is a side view of a container content monitoring device in accordance with embodiments of the present disclosure.

Referring to FIG. 9A, a CCM device 100 is shown that is similar to the CCM device 100 of FIG. 8 with a housing 104 arranged at a side surface of the outer body 502 of the container 500 via a surface mount; the same reference numerals refer to the same elements having the same structures and functions and, thus, will not be repeated here. The container 500 of FIG. 9A further includes an identifier 516, which in this embodiment is a QR code. The identifier 516 can be, without limitation, a quick response code (e.g. QR code; a 2-dimensional bar code type), a serial number, a radio frequency identification (RFID) tag, or a near field communication tag or smart tag. The identifier 516 is configured to be detected (i.e. read or scanned) by a user device 400.

When the identifier 516 is detected by a user device 400, the user device 400 is configured to communicate directly or indirectly with the cloud server 300 (FIG. 6) interface to update the cloud server 300 and/or the user device 400 with the most recent and/or historical readings, and/or with determinations made by the CCM device 100 that is associated with that particular container 500 and arranged to measure data for that container 500 (e.g. weight, temperature, relative humidity or other data being capable of being monitored by the CCM device 100). The container 500 may be previously associated with that particular CCM device 100 earlier by a user by, for example, associating the CCM device 100 and the container 500 by detecting their identifiers 116, 516 with the user device 400 (or other device) and associating the CCM device in the cloud 300 and/or in the user device 400. The associations can be changed or updated as necessary when, for example, the CCM device 100 is later associated with a different container 500.

Figure 9B:
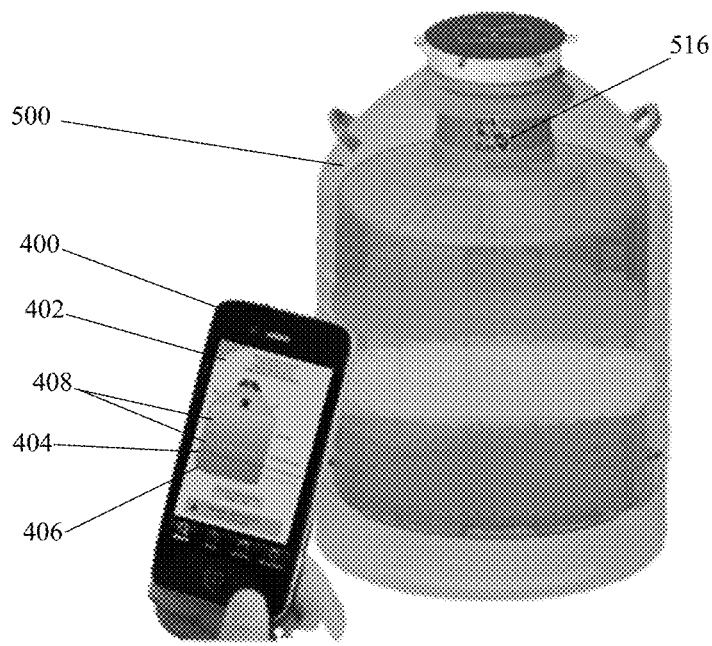
FIG. 9B is a view of a user device and container according to FIG. 9A in accordance with embodiments of the present disclosure.

Referring to FIG. 9B, which shows a different view of the user device 400 and container 500 of FIG. 9A with the CCM device 100 not shown for illustrative convenience, the user device 400 depicts an exemplary user interface 402 on the screen of the user device 400 following a detection of the identifier 516 by the user device 400. In this embodiment, the user interface 402 shows a determined liquid nitrogen level with a level indicator 404 on an image 406 depicting the container 500 as determined and/or measured by the CCM device 100, the cloud server 300 and/or the user device 400 based on data measured by the CCM device 100. In FIG. 9A, the level indicator 404 shows the level of liquid nitrogen being outside of a predetermined range boundaries 408, which are graphically shown on the image 406 of the container 500. The user interface 402 also shows a determined external surface temperature, determined weight of the container and/or determined relative humidity as determined or measured by the CCM device 100, cloud server 300 or user device 400. In this embodiment, the level indicator 404 is a graphical level X-ray type view, however, it should be readily understood by those of ordinary skill in the art that level data (or other parameter measured/determined data) may be shown in virtually any form and be within the scope of the present disclosure. For example and without limitation, the determined level of liquid nitrogen in the container 500 may be depicted by a number indicating percentage, height or weight, etc, or by a bar graph or other type of graph indicating an amount or level of nitrogen (or other substance).

Advantageously, a container content monitoring system comprising a plurality of containers 500 each having a respective CCM device 100 can be accurately and efficiently managed by a user since a user can utilize a user device 400 to associate each CCM device 100 with its respective container 500 and then later check in on the status of the container 500 by detecting the identifier 516 of the container 500. Since the CCM device 100 is associated with that identifier container 500, the user device 400 is configured to access the cloud server 300 and/or the CCM device 100 and display on the user interface 402 the relevant data being measured and/or determined by the CCM device 100, cloud 300 or user device 400 for that container 500, including for example, the weight of the liquid nitrogen (or other substance) held in the container 500, the temperature of one or more external surfaces of the container 500.

In some embodiments, the user interface 402 depicts an overall health indicator of the container 500, such as, for example and without limitation, by showing a green indicator (indicative for good health) if one or more parameters measured and/or determined are within a first predetermined range, a yellow indicator (indicative for caution) when the one or more parameters are within a second predetermined range, and/or a red indicator (indicative for bad health) when the one or more parameters are within a third predetermined range as determined by the CCM device 100, cloud 300 and/or device 400 to correspond to a critical value (e.g. critical weight, temperature, liquid nitrogen level and/or relative humidity).

In some embodiments, the CCM device 100, cloud server 300 and/or user device 400 may register the CCM device 100 as being in a fill mode where alarm functionality is disabled (e.g. temporarily) in order for a user to be able to perform the necessary steps to fill the container 500 with liquid nitrogen without triggering an alarm. The user may register the CCM device 100 as being in a monitoring mode or a fill mode through the user device 400 or through an input on the CCM device 100, which can be automatically registered as defaulting or switching to the monitoring mode after a predetermined stabilization amount of time (e.g. five minutes) or until stabilization of the container 500 system is determined by the CCM device 100. In the fill mode, the CCM device 100, cloud server 300 and/or user device 400 continue to data log all conditions but simply do not trigger any alarms or notifications (e.g. call tree actions), which advantageously allows the container 500 to be filled, refilled or partially filled without unnecessarily needing to trigger alarms or notifications, or needing to remove or deactivate the CCM device 100 entirely. The ability to continue to log data with time stamps throughout every fill cycle advantageously may satisfy various audit requirements required internally and/or by government regulations.

Further, the user device 400 may advantageously show the determined level of the liquid nitrogen on the user interface 402 while a user fills the container 500 with liquid nitrogen (and/or other substance(s)) while the CCM device 100 is registered in the fill mode or even while in the monitoring mode. The ability to in real-time view the level of the liquid nitrogen (and/or other substance(s)) in the container 500 while filling advantageously allows the user to quickly, accurately and confidently fill the container 500 with less probability of user error occurring. User error may result in overspills which can stress the container 500 if liquid nitrogen (and/or other substance(s)) contacts the outer body 502 of the container and, thus, reduced user error may advantageously prolong the usable life of the container 500 and reduce exposure of the filling substance outside of the container 500 which could pose environmental and/or personnel hazardous conditions. For example, over spilling liquid nitrogen can cause oxygen depletion exposure, undesired cryogenic temperatures outside of the container 500 and/or waste of resources. Once the container 500 is full and the user has subsequently registered the CCM device 100 in a monitoring mode, or after a predetermined stabilization time period, the CCM device 100 can continue to monitor the relevant parameters with alarm/notification protocols as disclosed herein, and can resume normal preset interval and reporting functionality.

Advantageously, the systems and devices disclosed herein may be used in connection with storage facilities that use cryogenic storage containers to store embryos, sperm and oocytes. Such storage facilities could utilize the systems and devices herein to reliably monitor liquid nitrogen contents (or other cryogen substance) of the storage containers. In the event of a container failure, breach or improper lid securement, the systems and devices disclosed herein could distribute alerts to employees or contractors of the facility to address the container failure before the temperature in the container increased beyond a temperature that would cause damage to the stored embryos, sperm or oocytes. While the systems and devices may advantageously be used in cryogenic storage facilities, it is within the scope of the present disclosure for the systems and devices to be used in other facility types and to monitor other types of containers or objects storing different contents therein.

In some embodiments, the CCM device 100 is configured to communicate with one or more other CCM devices 100. In such a configuration, the CCM devices 100 are capable of comparing obtained temperature readings for analysis. For example, the obtained temperature readings can be averaged such that each obtained temperature reading is compared to the average in order to accurately compare the temperature of the bottom 510 and/or outer body 502 of a particular container with the ambient room temperature. The compared temperature readings can obtain measurements obtained by the temperature sensor 110 arranged to measure the temperature of the bottom 510 and/or outer body 502 of the container 500 and/or the temperature sensor 111 arranged to measure the room temperature.

While the controller 106 has been described as performing the processing (or analysis) of the obtained weight and temperature data, it is within the scope of the present disclosure for the processing of the weight and temperature data (and VOC data) to be performed by a different processor remote from the controller 106 and CCM device 100. For example, the controller 106 may function primarily to collect the data from the sensors and transmit the data to the cloud server 300 for remote processing. The controller 106 and/or the cloud server 300 may be configured to automatically distribute alerts to user devices in different forms, such as by text message, email, audio sounds, flashing lights, and the like. In some embodiments, the controller 106 and/or cloud server 300 may communicate with several user devices 400 through an application interface, which interface enables remote monitoring of parameters of the CCM device(s) 100. In addition to real-time mobile monitoring of parameters, the application interface allows alerts such as push notifications to be distributed to a user device if a certain set of parameters is recognized. In some embodiments, a telephone call tree may be used whereby the controller 106 and/or cloud server 300 causes successive telephone calls to user devices until a response or confirmation is received. In some embodiments, the CCM device(s) 100 is configured to communicate with the cloud server 300 (e.g. with the transmitter/transceiver 112 through the gateway 200) at predetermined intervals, for example and without limitation, once every day. In some embodiments, if the CCM device(s) 100 is unable to communicate with the cloud server 300 then the CCM device(s) 100 is configured to emit an alarm through an audible tone (e.g. through a speaker) and/or visual means (e.g. a light or flashing light); and/or the cloud server 300 is configured to make the successive calls through the predetermined call tree (e.g. emails, telephone call, text message, etc.) until a confirmation is received. The notification/alert from the CCM device(s) 100 and/or the cloud server 300 may prompt a user or technician to diagnose and fix the communication issue(s) (e.g. no internet, malfunctioning gateway 200, etc.). In some embodiments, the CCM device(s) 100 are configured to generate an alarm or alert (as described above with audio and/or visual alerts) if it is determined that the cloud server 300 is unable to successfully send notifications/alerts (e.g. no functioning email or telephone systems available).

Additionally, the controller 106 and/or cloud server 300 may be in communication with a server enabling a web interface. Users would be able to achieve similar monitoring and identification functions as described above with respect to a mobile application by using the web interface.

The cloud server 300 may be configured to continuously, intermittently or periodically analyze the data collected by the CCM device(s) 100 in order to yield predictive information for predictive analytics. For example, the cloud server 300 could be configured to use the obtained weight and temperature data gathered over time to predict if one or more containers 500 is failing or has failed before an alert would otherwise be generated based on the thresholds. Based on identified patterns of evaporation rate of the contents of the container(s), the cloud server 300 could predict when one or more containers need to be refilled with additional contents and/or when the container(s) need to be replaced.

The predictive analytics model may begin functioning after any given container 500 has compiled ample data after a period of time, e.g. over a period of months, taking into account a frequency of access to any given tank 500 by the user, the average container temperature, the average ambient temperature and the rate at which normal evaporation takes place over a period of time during normal use. This establishes a threshold of acceptable operation parameters. Once the above normal averages are established for any given container 500, the CCM predictive analytics programming may predict a failure if one or more of the following takes place: #1 the loss of weight exceeds the normal average; #2 the external container 500 displays a colder than normal average temperature at surface 102 or other known stable temperature data logged area; and/or #3 the surface temperature of container 500 drops while the average ambient temperature remains constant.

The above combined data will allow CCM algorithms to predict there is a vacuum compromise and/or failure taking place based on deviations from an average weight loss over time or from an average temperature over time of the container 500.

Since the CCM algorithms take into account the frequency of container access, embodiments of CCM devices and systems according to the present disclosure may be configured to predict container failure whether the container has low usage (i.e. long-term storage with infrequent access) or for higher usage (i.e. more frequent access to container for addition/removal of items stored within the container, for sampling or for other purposes). The change in weight and/or temperature for low usage or higher usage container applications can be recognized by CCM devices and systems according to the present disclosure and be accounted for when determining container failures and/or distributing alerts.

In some embodiments, instead of distributing alerts to user devices for manual refilling of container contents, or in addition thereto, the controller 106 and/or cloud server 300 could be configured to cause a refilling device (not shown) to refill the container with the appropriate contents if an alert is generated due to one or more measured parameters exceeding one or more thresholds.

In some embodiments, the top plate 102 may be made of stainless steel or a hard plastic, such as ABS plastic, such that the top plate 102 is durable, washable, and/or non-porous.

In some embodiments, the identifier 116 may be placed on the front-right side of the housing 104 of the CCM device 100 for easy scanning and/or visibility. The display screen 114 may be placed on the front side of the device and display current obtained data, warnings, and/or alerts. The display 116 may be local or remote and may also be displayed on a user device 400 or other computer display.

It should be readily understood by those skilled in the art that the transceiver 112 may utilize one or more known forms of wireless communication, such as, for example and without limitation, WiFi, Bluetooth (e.g. Bluetooth 5.0), cellular or mobile communications networks, radio communication, near field communication, and/or the like. The transceiver 112 may communicate by use of a router, Bluetooth gateway, or other modem.

While the transceiver 112 has been shown and described herein as being a wireless transceiver, it should be readily understood that wired transceivers may be used instead of a wireless transceiver (or in addition to) and are within the scope of the present disclosure. Further, the function of the transceiver 112 could be accomplished with a transmitter and receiver configuration. Moreover, any of the wireless communication described herein in connection with the other components could additionally or alternatively be accomplished with known wired communication technology. For example, the gateway 200 could be wired to the cloud server 300.

While the identifier 116 has been shown and described as being a bar code, it should be readily understood that any kind of identifier can be used instead of a bar code or in addition to a bar code. For example, the identifier can be, without limitation, a quick response code (i.e. a "QR" code; a 2-dimensional bar code type), a serial number, a radio frequency identification (RFID) tag, or a near field communication tag or smart tag.

It should be understood that any number of the disclosed elements or features are within the scope of the present disclosure. For example, in some CCM systems there may be a single CCM device 100, or multiple gateways 200, server clouds 300 and/or user devices 400.

While the various components of the CCM system 10 and the CCM device 100 have been shown in particular locations or relative spatial positioning, it should be readily understood that virtually any other configuration or arrangement is within the scope of the present disclosure to achieve the functions and purposes described herein.

It is within the scope of the present disclosure to monitor the contents of any type or size of object or container. Accordingly, the container could be made of any material and could have any lid mechanism without the need to have a temperature sensor arrangement be installed in the lid. Thus, temperature sensors of the CCM systems and devices of the present disclosure may advantageously avoid the wear or damage associated with the removal or mounting of a lid with an object or container.

While embodiments of the present disclosure have been shown and described for monitoring containers containing liquid nitrogen, embodiments for monitoring containers containing other elements or compounds are within the scope of the present disclosure.

The present disclosure advantageously describes a CCM system 10 and CCM device 100 that can be suitably modified for a wide range of content monitoring applications. Thus, embodiments in accordance with the present disclosure are advantageously scalable in size and material types to achieve the particular objectives.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A method of monitoring a container with a container content monitoring device comprising:
    registering the container content monitoring device as being in a fill mode that disables one or more alarm protocols or notification protocols of the container content monitoring device while in the fill mode;
    filling an inner volume of the container with a substance; and
    displaying, on a user device, at least one parameter of the container as determined or measured by the container content monitoring device while the filling is occurring; and
    wherein the displayed parameter dynamically changes while the filling is occurring; and
    wherein the registering occurs prior to the filling.

2. The method according to claim 1, wherein the substance is liquid nitrogen.

3. The method according to claim 1, wherein the at least one parameter comprises a weight of the container.

4. The method according to claim 1, wherein the at least one parameter comprises a height level of the substance.

5. The method according to claim 1, further comprising:
    detecting, with the user device, an identifier of the container;
    wherein the detecting occurs prior to the filling.

6. The method according to claim 5, wherein the identifier is a QR code.

7. The method according to claim 1, wherein container content monitoring device measures and/or logs data associated with the container while in the fill mode.

8. The method according to claim 1, wherein the container content monitoring device and/or a cloud server remote from the container content monitoring device is configured to register the container content monitoring device in a monitoring mode after a predetermined amount of time, and wherein in the monitoring mode the one or more alarm protocols or notification protocols are enabled.

9. The method according to claim 1, further comprising:
    displaying, on the user device, a green indicator when the at least one parameter is within a first predetermined range, a yellow indicator when the at least one parameter is within a second predetermined range and a red indicator when the at least one parameter is within a third predetermined range.

* * * * *